July 1, 1958     F. R. MORTIMER     2,841,387
ACCELERATION AND DECELERATION SENSING DEVICE
Filed Feb. 8, 1955     4 Sheets-Sheet 3
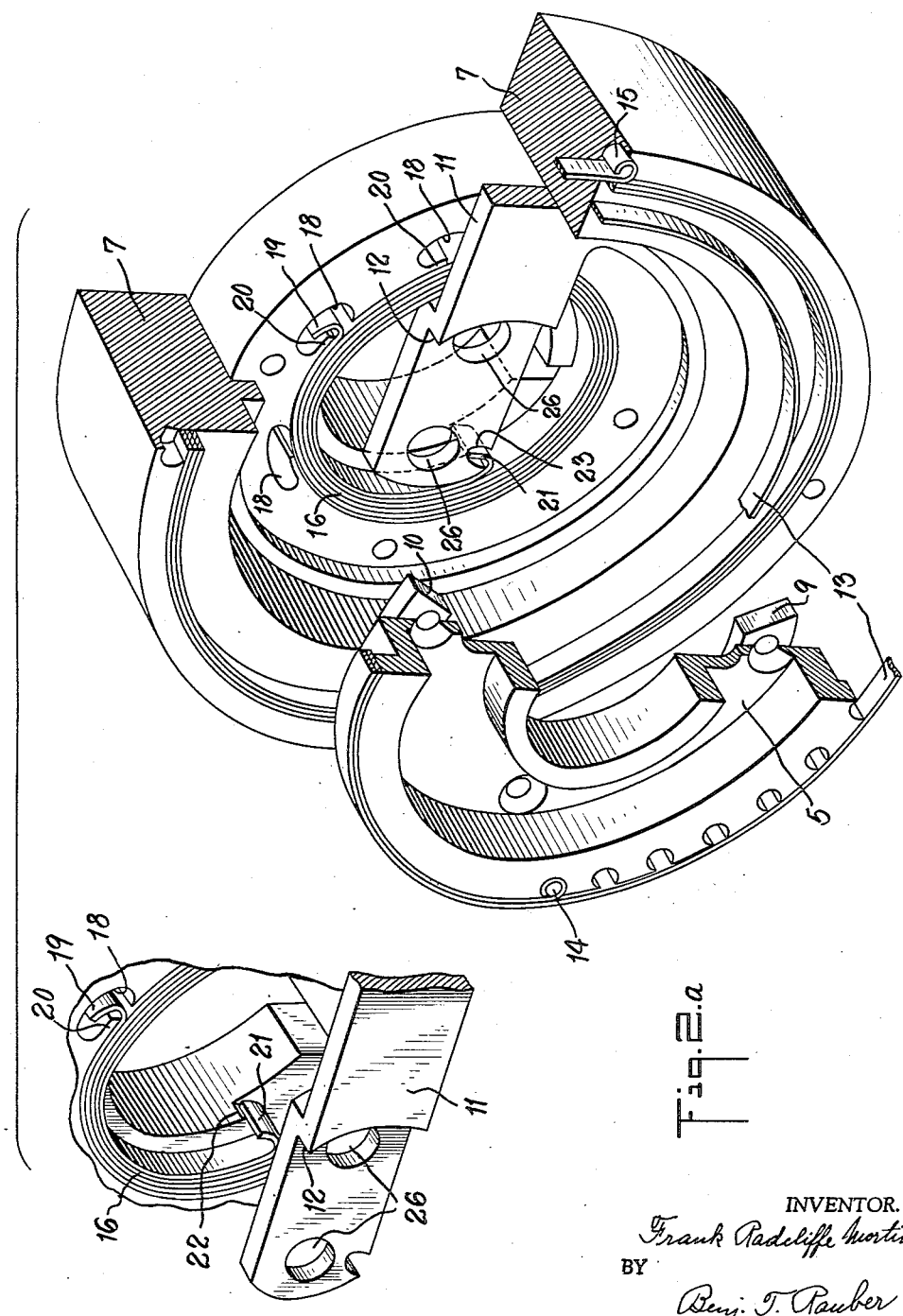
Fig. 2.a
INVENTOR.
Frank Radcliffe Mortimer
BY
Benj. T. Rauber
ATTORNEY July 1, 1958  F. R. MORTIMER  2,841,387
ACCELERATION AND DECELERATION SENSING DEVICE
Filed Feb. 8, 1955  4 Sheets-Sheet 4

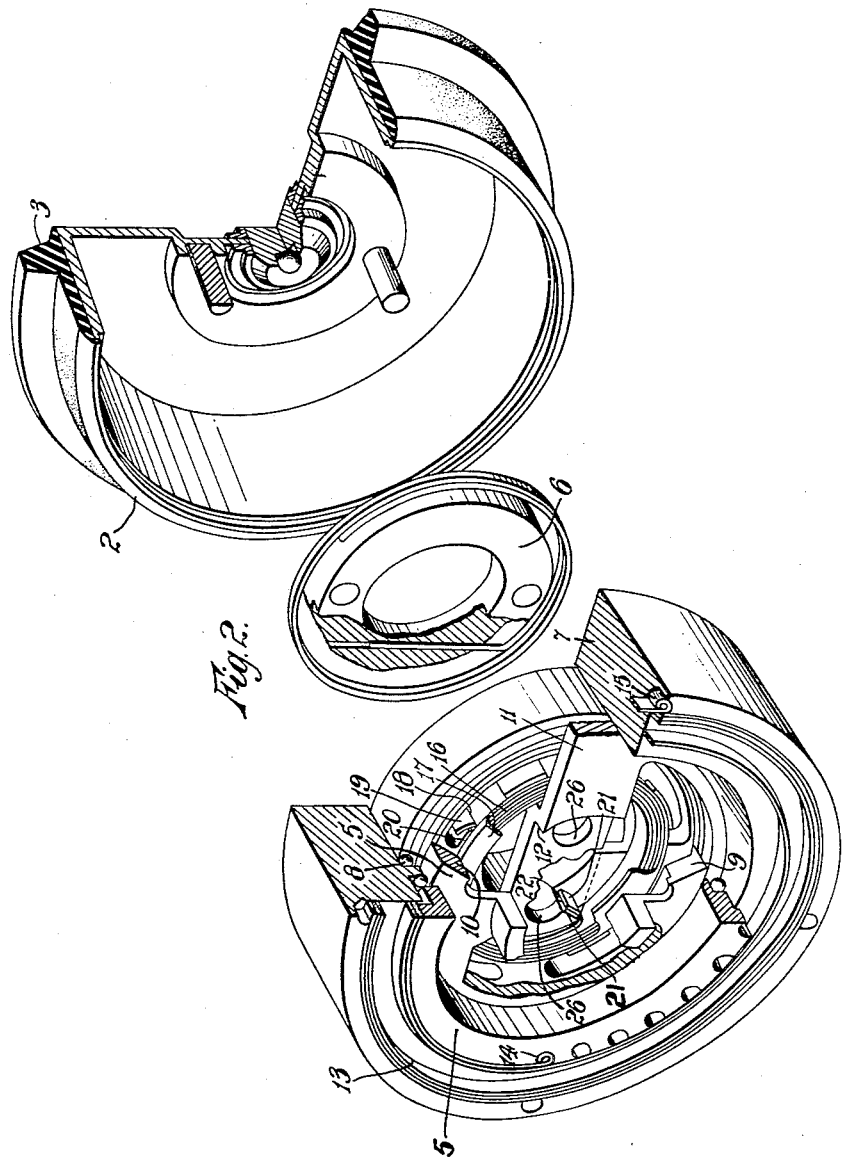

INVENTOR
Frank Radcliffe Mortimer
by Benj. T. Rauber
his attorney

United States Patent Office 2,841,387
Patented July 1, 1958

2,841,387

ACCELERATION AND DECELERATION SENSING DEVICE

Frank Radcliffe Mortimer, Stivichale, Coventry, England, assignor to Dunlop Rubber Company Limited, London, England, a British company Application February 8, 1955, Serial No. 486,948

Claims priority, application Great Britain February 9, 1954

8 Claims. (Cl. 264—1)

This invention relates to automatic braking apparatus and more particularly relates to the type of automatic braking apparatus described and claimed in my patent specification Number 2,656,017.

In patent specification Number 2,656,017 an apparatus is described for automatically regulating the fluid pressure supply to the fluid pressure operated brakes of aircraft landing wheels in such a manner as to provide the maximum deceleration of the aircraft without sliding or slipping of the landing wheels. The apparatus comprises a housing rotatable by one of said wheels, a drum-member rotatable on bearings within the housing, and an annular flywheel which is rotatable between the outer periphery of the drum-member and the inner periphery of the housing and which has a beam extending diametrically across its inner periphery and through two diametrically opposed slots extending through the periphery of the drum-member at the median plane thereof. A friction clutch is provided to drive the drum-member, the clutch itself being driven by the housing. A clock-type spring is fitted between the flywheel and the drum-member to urge the flywheel relative to the drum-member so that the flywheel beam normally abuts one end of each of the slots through the drum-member, and the flywheel is thus driven by the drum-member on rotation of the wheel. In this relative position of the flywheel and drum-member the brakes may be applied, but on sliding or skidding of the landing wheel the drum-member decelerates with the wheel whilst the inertia of the flywheel moves it against the spring to a position in which the braking pressure is cut off.

In the construction hereinabove described the flywheel is single acting, i. e. it moves in one direction only relative to the drum-member from a "brakes-on" to a "brakes-off" position. This has certain disadvantages, and in co-pending application Serial Number 432,228 of May 25, 1954, now Patent No. 2,766,853 a double acting flywheel is provided which largely overcomes these disadvantages.

The object of the present invention is to provide apparatus of the type described in patent specification No. 2,656,017 and comprising an improved type of double-acting flywheel.

According to the present invention apparatus for automatically controlling the braking pressure in a fluid pressure operated wheel brake comprises a housing rotatable by a wheel, a member rotatable in and driven by said housing, a flywheel rotatable in said housing and driven by said member and capable of limited angular displacement relative thereto, resilient means acting on the flywheel in opposite directions, one of said means tending to move the flywheel in one angular direction against a stop formed on the other of said resilient means, thereby to normally hold the flywheel in a central position relative to the limits of its displacement, a valve member connected to a source of fluid pressure, to exhaust and to said brake and means movable axially by movement of said flywheel from its central position to operate the valve mechanism and vary the braking pressure.

Preferably the flywheel is annular and is provided with a spoke extending radially inwardly from the inner periphery thereof. The flywheel is rotatable on the outer periphery of a drum-member which is provided, on the median plane thereof, with a part-annular slot having ends which subtend between them an angle of the order of 120°, and the flywheel spoke extends into said slot. A clock-type spring has one end secured to the flywheel and the other end to the drum-member, and another, stronger clock-type spring is provided having one end secured to the drum-member and the other end formed to provide a yielding stop for the flywheel spoke, and to maintain said spoke mid-way along the slot in the drum-member. When the spoke is so positioned the valve mechanism is operated to allow the fluid pressure to flow therethrough from the source to the wheel brakes. On angular acceleration or deceleration of the flywheel relative to the drum-member the spoke moves, against the force of one of the clock-type springs, towards one or other end of the slot, and in this position of the spoke relative to the drum-member the valve mechanism is operated to reduce or prevent the passage of fluid pressure from the source to the brakes.

The invention will now be described with reference to the accompanying drawings of which:

Figure 2 is an exploded view of part of the apparatus of Figure 1.

Fig. 2a is a similar view with a part of the drum spaced outwardly to show further details.

Figure 1:
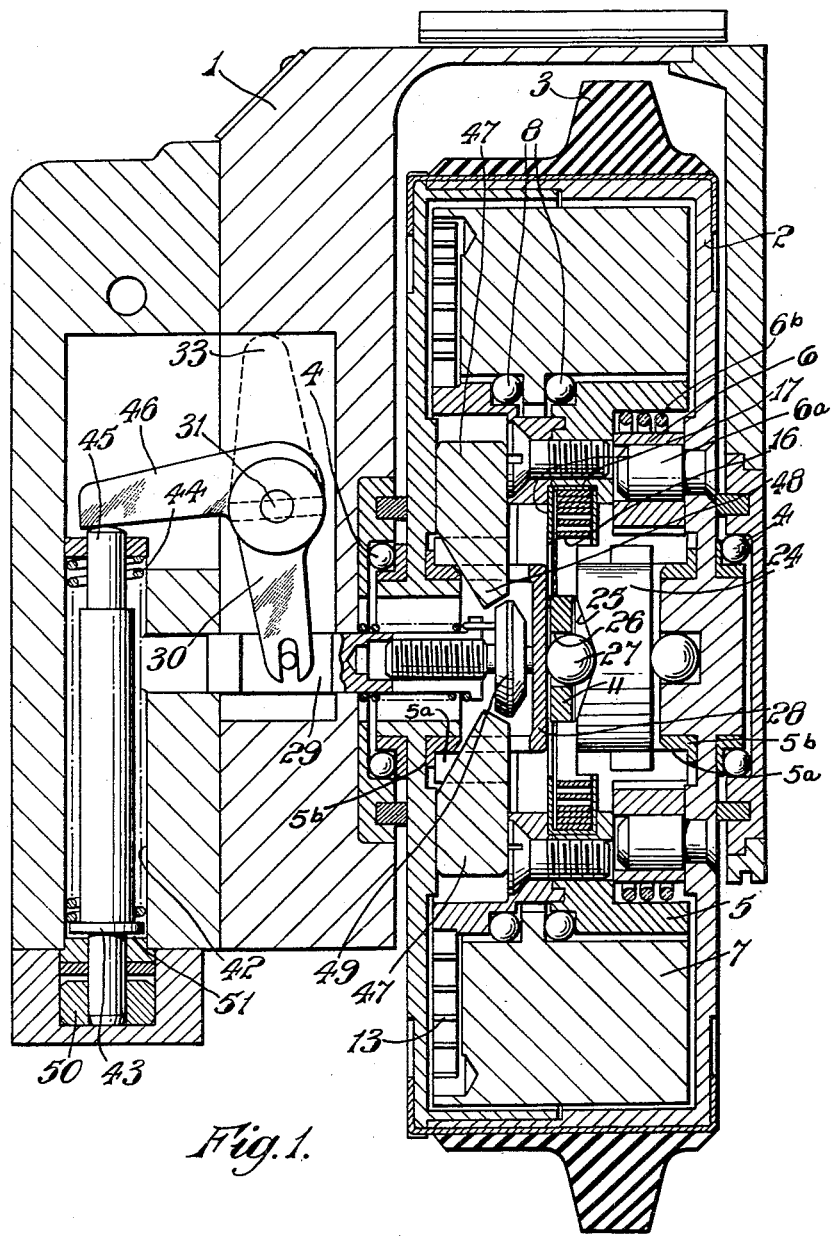
Figure 1 is a sectional view of an automatic braking apparatus incorporating the device of the present invention.

The apparatus comprises a bracket 1 mounted on a non-rotatable part of a landing wheel and brake assembly having a hollow cylindrical housing 2 (Figures 1 and 2) rotatable therein. The housing is provided, on its outer periphery, with a rubber tyre 3 which in operation frictionally engages with the wheel whereby the housing 2 is rotatable by the wheel. The housing is rotatable on ball bearings 4 between a hub of the housing and a raceway in the bracket 1. Within the housing and co-axial therewith is an annular drum member 5 having inner bearing surfaces 5ᵃ rotatable in journals 5ᵇ in the housing 2.

The drum member 5 is driven from the housing through a friction clutch comprising a clutch plate 6 secured to the housing by pins 6ᵃ and having a coil spring 6ᵇ secured at one end to the clutch plate and pressing outwardly against a cylindrical recess in the drum member so arranged that when the housing is driven forwardly the spring expands to grip the drum with a heavy torque and with a lighter torque in the reverse direction.

An annular flywheel 7 is located between the outer periphery of the drum-member 5 and the inner periphery of the housing 2 and said flywheel is rotatable on bearings 8 carried by the drum-member. The drum-member is provided, on the median plane thereof, with a part-annular slot having radially-extending ends 9 and 10, (Figure 2) which between them subtend an angle of 120°. The flywheel 7 is provided with a spoke 11 which extends inwardly through the part-annular slot of the drum-member from a location on the inner periphery of the flywheel, the end of said spoke 11 terminating a short distance away from the inner periphery of the drum-member. The spoke 11 has a step formed therein intermediate its ends as shown at 12 (Figure 2).

One of the radially-extending sides of the flywheel 7 is recessed and located therein is a clock-type spring 13, hereinafter termed the deceleration spring, one end thereof being adjustably secured to the outer periphery of the drum-member 5 as shown at 14 and the other end being similarly secured to the flywheel adjacent its outer periphery as shown at 15. Another clock-type spring 16 hereinafter termed the acceleration spring, is located adjacent the inner periphery of the drum-member 5 being enclosed within a spring case 17 which has a slot 18 in its outer periphery through which one end of the acceleration spring protrudes. This end of said spring is formed as a hook 19 (Figure 2) to engage with one of a number of notches 20 formed on the inner periphery of the drum-member 5, to provide means whereby said spring end may be adjustably located. The other end of the acceleration spring 16 is also formed as a hook 21 which engages a notch 22 at one end of the spoke 11 and thus is connected to the flywheel 7.

The two springs 13 and 16 are both in tension and act in opposite directions, the acceleration spring 16 being the stronger. The hook end 19 of the acceleration spring normally abuts an edge of the notch 20 of the drum member while the hook 21 at the other end abuts an edge of the notch 22 of the flywheel spoke 11 when this spoke is midway between the ends 9 and 10 of the 120° slot in the drum member. In this position also one end 15 of the spring 13 engages a notch in the flywheel while the other end 14 engages one of a series of notches in the drum. When the drum accelerates it tensions the strong accelerating spring 16 transmitting a strong torque to the flywheel. When the drum decelerates it tensions the weaker spring 13 transmitting a relatively weak torque.

A cylindrical cam-member 24 (Figure 1) is fitted within the inner periphery of the drum-member and is rotatable therewith. The cam-member is located on one side of the flywheel spoke 11 and the side of the cam-member 24 adjacent said spoke is provided with a shallow recess 25 of V section extending diametrically thereacross. The flywheel spoke is provided with two equi-sized holes 26, equi-spaced one on each side of the axis of the flywheel, and a ball 27 is located in each of said holes, said balls being seated in the bottom of the recess 25 in the cam-member 24 when the flywheel spoke is centrally disposed relative to the slot in the drum-member, in which position it is held, when the drum-member and flywheel are relatively stationary, by the opposed clock-type springs.

A disc 28, co-axial with the drum-member abuts the centre of the flywheel spoke on the side thereof remote from the cam-member 24, and one end of a non-rotatable operating rod 29 is spring-urged into contact with this disc.

Figure 4:
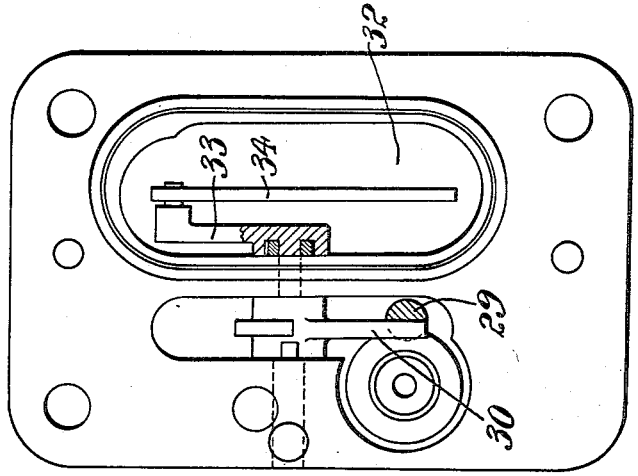
Figure 4 is an end view of the valve actuating mechanism and pressure chamber of the apparatus of Figures 1 and 3.
Figure 3:
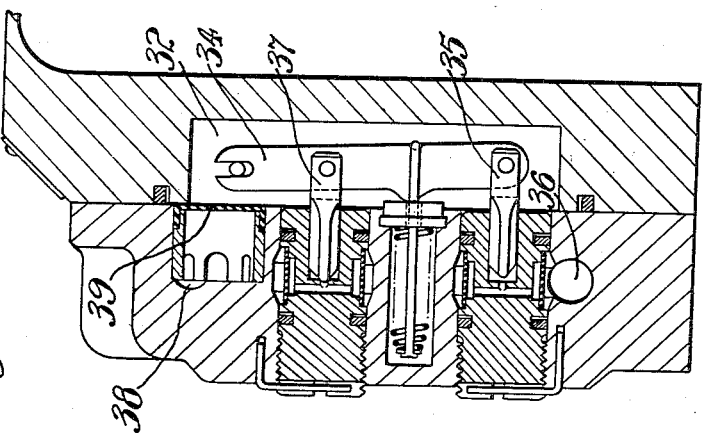
Figure 3 is a sectional view of the valve mechanism of the automatic braking apparatus.

The operating rod has attached thereto one end of a lever arm 30, the other end thereof being connected to a spindle 31 which extends pressure-tightly into the pressure chamber 32 of a valve mechanism (Figures 3 and 4) associated with one arm of the bifurcated bracket 1. The end of the spindle 31 within the pressure chamber 32 has secured thereto a lever arm 33 (Figure 4) diametrically opposed to the lever arm 30 and associated with the end of said arm 33 is a valve beam 34 having at one end thereof a fluted inlet valve closure member 35, said inlet valve communicating with a conduit 36 adapted to lead to a supply of pressure fluid. Secured to the said beam 34 intermediate its ends is a fluted exhaust valve closure member 37 said exhaust valve communicating with a reservoir. A conduit 38 protected by a filter gauze 39 is adapted to communicate with the associated wheel brakes. With the balls 27 of the flywheel spoke 11 seated in the bottom of their associated recess 25 of the cam-member 24 the operating rod is in such a position that the inlet valve is open and the exhaust valve shut. A valve mechanism of this type, and its method of operation, are more fully described in Patent Number 2,656,017.

A device for preventing the application of braking pressure before the landing wheels have rotated on landing and the method of operation thereof is described in co-pending application Serial No. 317,522 of October 29, 1952 now Patent 2,723,090 of November 8, 1955 and is also illustrated in Figure 1 of the accompanying drawings. This device comprises a cylinder 42 secured to one arm of the bracket 1 alongside the valve mechanism hereinabove described. A plunger 43 is pressure-tightly slidable in said cylinder against a compression spring 44, the end of the plunger being provided with a peg 45 against which bears one end of an arm 46 secured to said spindle 31 and at right angles to the lever arms 30 and 33. Two arcuate centrifugal releases 47 are located in the side of the flywheel 7 remote from the clutch mechanism 6, said releases being spring-loaded inwardly. Each of said releases 47 is provided at its inner periphery and substantially intermediate its ends with an inwardly extending peg 48, the end thereof being adapted to engage with an annular member 49 at the end of the operating rod 29.

The end of the cylinder 42 is provided with a closure member 50, an annular gap 51 being provided between the closure member and the adjacent face of the plunger 43 said annular gap being operatively connected to a source of hydraulic pressure.

The operation of the apparatus is as follows.

As each wheel of the aircraft rotates on landing it rotates the housing 2 associated therewith. The housing, acting through the friction clutch 6, spins up the drum-member 5 until it is rotating at the same speed as the housing. Assuming the flywheel spoke 11 to be in its balanced mid-position, the first 60° of angular movement of the drum-member will cause the end 9 of the slot therein to abut the side of the spoke 11, whereupon the flywheel will be driven at the same speed as the drum-member. On such relative angular movement between the flywheel and drum-member the deceleration spring 13 is tensioned but the acceleration spring 16 is not tensioned by such movement, the hooked end 21 merely moving with the stop 22 away from stop 23. At the same time the balls 27 located in the two holes 26 of the flywheel spoke 11 move up the inclined sides of the V-shaped recess 25 in the cam-member 24 which is rotatable with the drum-member 5. The balls thus move axially through said holes 26 and, abutting the disc 28 on the other side of the flywheel spoke, move the disc 28 and also move the operating rod 29, which has one end spring-urged into contact with the disc into such a position that the inlet valve 35 of the valve mechanism is shut and the exhaust valve 37 open.

As soon as the flywheel 7 is rotating at the same speed as the drum-member 5, which is immediately after the end 9 of the slot in the drum-member abuts the flywheel spoke, the deceleration spring 13 takes charge and moves the flywheel back until the spoke is central relative to the slot and the hooked end 21 is once more seated on the stop 23. The balls 27 are forced back into the bottom of their associated recess 25 by the spring-loaded operating rod 29 until said rod is in a position wherein the inlet valve 35 is open and the exhaust valve 37 closed. This entire operation takes place within a fraction of a second of the wheel first rotating on landing.

The braking pressure may then be applied through the pilot's control and this pressure flows through the open inlet valve of the valve mechanism and thence to the wheel brake to decelerate the wheel in the manner described in Patent No. 2,656,017. It may happen, however, that one or more of the landing wheels "bounce" during the landing run and after the brakes have been applied. With the weight of the aircraft off the wheel it will immediately lock because of the applied braking pressure and the housing 2 will decelerate with the wheel. The flywheel 7 however, due to its inertia will continue to run on, the clutch mechanism 6 providing only a light torque in this direction to allow the flywheel and drum-member to rotate relative to the housing 2 for a predetermined period of time. The flywheel spoke moves round 60° relative to the lightly decelerated drum-member thus tensioning the acceleration spring, the stop 23 moving with the hooked end 21 away from stop 22 thus closing the inlet valve 35 and opening the exhaust valve 37, in the manner described above, and this relieves the braking pressure at the wheel brake. When the wheel touches down once more therefore it is not locked but is freely rotatable, providing only that the bounce is not of excessive duration and the flywheel is still rotating when the bounce terminates.

As soon as the wheel touches down once more it spins up until it is rotating at an angular velocity commensurate with the ground speed of the aircraft. During the bounce, however, the flywheel has been decelerating, and after the bounce finishes may be rotating, e. g. at only half its original angular velocity or even less. With a single acting flywheel, of the type described in Patent No. 2,656,017, the brake would be re-applied as soon as the speed of the accelerating housing caught up with that of the decelerating flywheel, which may be rotating at an angular velocity of only half that commensurate with the aircraft landing speed, and this would cause the brakes to be re-applied too soon and too heavily. With the present double-acting flywheel, however, as the wheel spins up on touching down, the flywheel spoke is at the end 10 of the slot, the inlet valve of the valve mechanism being closed and the exhaust valve open, until the housing speed first matches and then exceeds the flywheel speed, when the flywheel spoke will move to the other end 9 of the slot, the inlet valve still being closed and the exhaust valve open. The inlet valve is opened for a fraction of a second when the spoke swings through the mid-position of the slots but the burst of pressure to the brakes is too momentary to be of any practical effect.

When the landing wheel is rotating once more at the true ground speed of the aircraft and the flywheel is rotating freely with the housing, the deceleration spring 13 will again take charge to move the flywheel beam back to its mid-position, thus opening the inlet valve and closing the exhaust valve and allowing the brakes to be re-applied.

In the apparatus hereinabove described the deceleration spring is re-acting on the flywheel through the whole of its range of movement relative to the drum-member, whilst the acceleration spring is only effective during a half of this range of movement. During the other half of this movement the acceleration spring load is taken in the stop associated with the drum-member the end of the flywheel spoke being biassed against the end of the acceleration spring by the deceleration spring. The acceleration spring is stronger than the deceleration spring in order that it may positively return the flywheel spoke to a central position between the ends of the slot, against the force exerted by the deceleration spring.

The device for preventing the application of the brakes before the landing wheels rotate on touching down operates as follows.

When the aircraft has taken off, hydraulic pressure is introduced into the annular gap 51 between the plunger 43 and the closure member 50 of the device. The pressure on the plunger 43 moves it against its spring 44, the peg 45 engaging with the arm 46 to move the operating rod 29 through lever arm 30 against its associated spring. The annular member 49 at the end of the operating rod 29 moves between the centrifugal releases 47 which are still held outwardly by the rotating wheel and is held on the other side of said releases when they move inwardly as the rate of rotation of the wheels drop below a predetermined value. Angular movement of the lever arm 30 simultaneously closes the inlet valve 35 and opens the exhaust valve 37. With the operating rod so held, braking pressure cannot be applied to the wheel brakes until the wheel rotates on landing, this rotation moving the centrifugal releases outwardly to release the operating rod which is then spring urged to a position whereby the inlet valve is open and the exhaust valve closed. With the valve in this position applied braking pressure is free to pass to the wheel brakes.

The centrifugally operated releases are usually arranged to open when the housing and drum-member are spinning at a rate corresponding to a landing speed of the order of 50 M. P. H. The touchdown speed of the aircraft frequently exceeds this speed, and may be of the order of 120 M. P. H. Thus with a single acting flywheel the brakes will be applied as soon as the wheel accelerates up to the speed required to disengage the releases. This may be considerably below the true landing speed with the result that the wheel will skid or slide until the automatic apparatus has corrected the braking pressure. With the double-acting flywheel of the present invention, however the flywheel spoke moves from one end of the slots to the other, i. e. through the "brakes-on" mid-position, when the stronger of the two opposed clock-springs will overcome the other spring to positively centralize the spoke relative to the slots in the drum-member to open the inlet valve and allow the braking pressure to flow to the brakes.

Having described my invention, what I claim is:

1. Apparatus for automatically controlling the braking pressure in a fluid pressure operated wheel brake which comprises a housing rotatable by a wheel, a member rotatable in and driven by said housing, a flywheel rotatable in said housing and having a limited angular displacement in opposite directions from a mid-position relative to said member, an accelerating spring connected between said member and said flywheel to drive said flywheel in a forward direction, a decelerating spring connected between said member and said flywheel to drive said flywheel in a reverse direction, said accelerating spring being stronger than said decelerating spring and said springs being so tensioned and positioned as to hold said flywheel in said mid-position when said flywheel and member rotate at the same speed, and control means displaceable by movement of said flywheel in either direction from its mid-position relative to said member.

2. The apparatus of claim 1 wherein said member has a part annular slot and wherein the flywheel has a spoke extending radially into said slot to limit relative rotation between said member and said flywheel.

3. The apparatus of claim 1 in which said springs are oppositely wound clock-type springs connected at their ends between said member and said flywheel.

4. The apparatus of claim 3 in which the member has circumferentially spaced engagement openings to connect to one end of said accelerating spring to adjust its position and tension.

5. The apparatus of claim 2 in which the accelerating spring is a clock-type spring connected at one end to said spoke and connected at its other end to said member and in which said decelerating spring is a clock-type spring wound oppositely to said accelerating spring and connected at one end to said member and at the opposite end to said flywheel.

6. The apparatus of claim 5 in which said member has spring engaging elements severally to engage said accelerating spring and spaced at angular intervals about the axis of rotation of said flywheel and member.

7. The apparatus of claim 6 in which said member has an outer periphery and an inner periphery and in which the spring engaging elements are in said inner periphery and in which the end of the decelerating spring is secured to said member at its outer periphery.

8. The apparatus of claim 7 in which said member has a series of spring engaging elements spaced circumferentially in its outer periphery in which the end of said decelerating spring may be engaged selectively.

References Cited in the file of this patent

UNITED STATES PATENTS

| | | |
|---|---|---|
| 2,573,387 | Bush | Oct. 30, 1951 |
| 2,656,017 | Trevaskis | Oct. 20, 1953 |
| 2,672,335 | Keller | Mar. 16, 1954 |
| 2,766,853 | Trevaskis et al. | Oct. 16, 1956 |